United States Patent [19]

Mantegazza

[11] Patent Number: 5,196,681
[45] Date of Patent: Mar. 23, 1993

[54] MAGNETIC INK MEDIUM AND CORRESPONDING READING UNIT, AND METHOD FOR USING SAME

[75] Inventor: Antonio Mantegazza, Noverasco Di Opera, Italy

[73] Assignee: Mantegazza Antonio Arti Grafiche S.r.l., Ospiate Di Bollate, Italy

[21] Appl. No.: 441,668

[22] Filed: Nov. 27, 1989

[51] Int. Cl.$^5$ .................. G06K 7/08; G06K 7/00; G06K 19/06
[52] U.S. Cl. ..................... 235/449; 235/440; 235/493
[58] Field of Search ............ 235/449, 493, 487, 440

[56] References Cited

U.S. PATENT DOCUMENTS

| | | | |
|---|---|---|---|
| 3,790,754 | 2/1974 | Black et al. | 235/493 |
| 4,303,949 | 12/1981 | Peronnet | 235/493 |
| 4,396,886 | 8/1983 | Koester et al. | 235/449 |
| 4,734,643 | 3/1988 | Bubenik et al. | 235/449 |

Primary Examiner—John W. Shepperd
Assistant Examiner—Christopher R. Glembocki
Attorney, Agent, or Firm—Guido Modiano; Albert Josif

[57] ABSTRACT

The magnetic ink medium includes a plurality of magnetic regions which have diversifiable magnetic intensity and are mutually separated by spaces. At least one first part of the regions has a magnetic coercivity which differs from the remaining regions of the plurality of regions, in order to obtain at least two different readouts of the same plurality of regions upon applying different magnetic fields for orientating the plurality of regions.

3 Claims, 1 Drawing Sheet

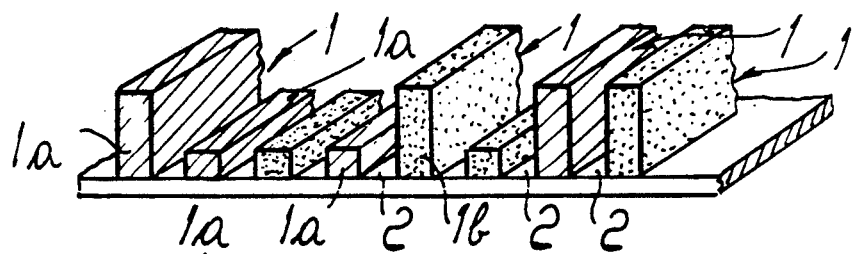
Fig. 1
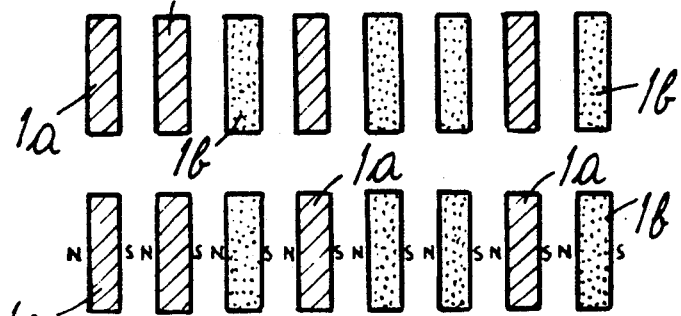
Fig. 2
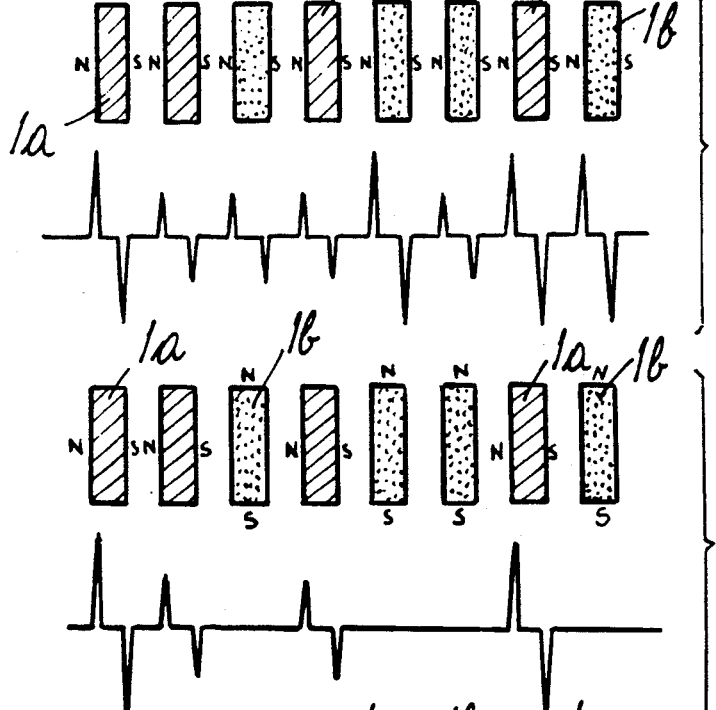
Fig. 3
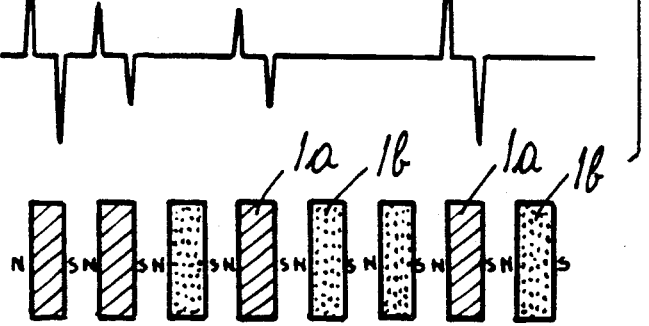
Fig. 4
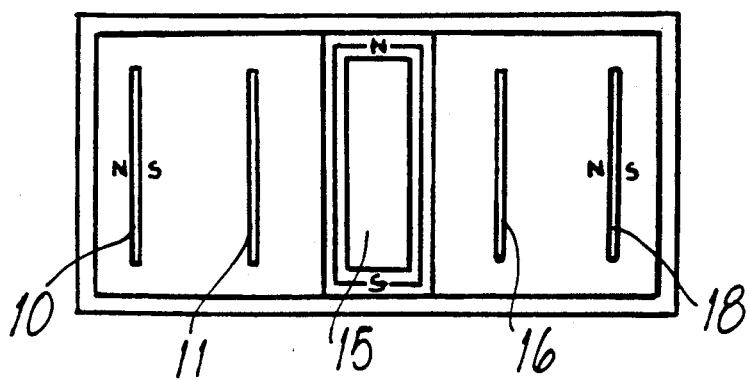
Fig. 5
Fig. 6

MAGNETIC INK MEDIUM AND CORRESPONDING READING UNIT, AND METHOD FOR USING SAME

BACKGROUND OF THE INVENTION

The present invention relates to a magnetic ink medium and corresponding reading unit, and a method for using same, the magnetic ink medium being particularly useful as an identification code for documents and the like.

EP-A-0310707 filed on Dec. 20, 1987 discloses a magnetically detectable identification code which has a plurality of regions or bars with diversifiable magnetic intensity which are mutually divided by blank spaces.

Said regions have a different magnetic intensity due to magnetic oxide layers with different thicknesses in the direction which is perpendicular to the laying plane of these regions or possibly regions in which the density of the magnetic oxide is diversified, so as to have different magnetic intensities which can be sensed or detected by a magnetic read head which generates a signal, the duration whereof is a function of the width of the regions and of the blank spaces in the read direction and the amplitude whereof is a function of the intensity of the magnetic field generated by each of said regions.

Said identification code, which is applied inside documents, for example by applying it onto a strip of plastic material which is embedded into the document or can possibly be applied directly onto the document or product, has proven itself to be very valid, since it allows to have a wide range of readouts which are determined not just by the presence or not of the magnetic region but also by its intensity.

This kind of code has turned out to be further improvable so as to significantly increase its security in terms of not allowing its fraudulent reproduction.

SUMMARY OF THE INVENTION

On the basis of this criterion, the aim of the invention is to provide a magnetic ink medium which is in effect an identification code which in practice has a code within the code, i.e. the possibility of having two or more different decodable readouts as provided by the reading unit for the magnetic ink medium.

Within the scope of the above described aim, a particular object of the invention is to provide a magnetic ink medium which can be optically concealed by introducing it inside the document or the like and possibly by using masking layers, but which, even in the cases in which it is optically visible, has different readout characteristics though it has the same outward configuration.

Another object of the present invention is to provide a magnetic ink medium which is particularly reliable and allows to provide a very high number of items of information.

Not least object of the present invention is to provide a magnetic ink medium having regions with different magnetic characteristics which can be optically identical, so that the code is not optically detectable and makes its fraudulent reproduction or forgery virtually impossible.

The above described aim, as well as the objects mentioned and others which will become apparent hereinafter, are achieved by a magnetic ink medium and corresponding reading unit, and method for using the same, as defined in the appended claims.

BRIEF DESCRIPTION OF THE DRAWINGS

The characteristics and advantages of the invention will become apparent from the detailed description of a preferred but not exclusive embodiment of a magnetic ink medium and corresponding reading unit, illustrated only by way of non-limitative example in the accompanying drawings, wherein:

FIG. 1 is a schematic perspective view of a practical representation of the magnetic ink medium, in which the regions with greater magnetic intensity are indicated by a greater thickness and the different coercivity of the magnetic material which constitutes said regions is schematically indicated by sloping lines and dots;

FIG. 2 is a schematic plan view of the magnetic regions of FIG. 1 pointing out the different coercivity thereof;

FIG. 3 is a plan view, with orientation indication, of the magnetic regions after a first orientation step, and the corresponding electrical signal as generated by the reading unit;

FIG. 4 is a view of the magnetic regions after a second different orientation step, and the corresponding electrical signal as generated by the reading unit;

FIG. 5 is a view of the orientation of all the magnetic regions after code readout has been performed by the reading unit;

FIG. 6 is a schematic view of the magnetic code reading unit.

DESCRIPTION OF THE PREFERRED EMBODIMENTS

With reference to the above figures, the magnetic ink medium, according to the invention, comprises a plurality of magnetic regions, generally indicated by the reference numeral 1, which are mutually spaced apart and are obtained by deposition for example of magnetic iron oxide.

Said regions 1 in practice constitute a bar code, since the various magnetic regions are separated by blank spaces 2.

Advantageously, the regions 1 have a different magnetic intensity which is obtained according to the characteristics illustrated in the above mentioned European patent application.

The peculiarity of the invention resides in that at least one part of said regions 1, indicated at 1a, has a magnetic coercivity which differs with respect to the remaining regions, indicated at 1b.

As a specific example, the regions 1a may have a high magnetic coercivity, for example 4000 Oe, whereas the regions 1b may have a low magnetic coercivity, for example 350 Oe.

This different coercivity is obtained by using different ranges of products, for example of the kind commercially known by the trade-name Bayferrox; it is also possible to obtain a plurality of groups of regions with different magnetic coercivity, further increasing the degree of security for magnetic sensing.

With the above described specific example, it is possible to obtain two different output readings, of the same plurality of regions by varying the magnetic field which orientates the regions.

Again with reference to the above described specific example, in which two different groups of regions with two different coercivities are provided, it is possible to perform a first readout by applying a first magnetic field for orientating all the regions 1; thus, for example, as illustrated in FIG. 3, it is possible to orientate the magnetic regions with a N-S, N-S, . . . , N-S arrangement along the direction in which the code is read or sensed, which is advantageously perpendicular to the extension of said regions, i.e. in the direction in which the various regions are side-by-side.

Then, by means of a magnetic sensing head, the code is read and an electrical signal is obtained, which has two pulses at each magnetic region, the intensity of these pulses corresponding to the magnetic intensity of said region.

Once this first readout has been performed, a second magnetic field is applied having such an intensity as to modify the orientation exclusively of the regions which have a low coercivity or in any case such a coercivity as to be affected by the applied magnetic field. In this manner, as illustrated in FIG. 4, some regions (with higher coercivity) preserve the North-South orientation in the readout direction, while other regions, i.e. those with lower coercivity, have a North-South orientation which is perpendicular to the read direction; in these conditions, the electrical signal obtained in the subsequent sensing step, has pulses only at the regions with North-South orientation in the readout direction, providing a readout which is different from the one performed earlier though it is done on the same plurality of regions.

In order to perform said readouts it is possible to use a magnetic reading unit as illustrated in FIG. 6 and comprising an entry magnet, indicated at 10, which generates a magnetic field capable of orientating all the regions along the North-South direction in the readout direction; a first read head 11 is arranged to the side of the entry magnet 10 and magnetically reads all the regions, generating an electrical signal which is a function of the position of such regions and of their intensity. After the first read head, the unit is provided with a reorientation magnet, indicated at 15, which generates a magnetic field according to a different direction with respect to the direction generated by the entry magnet and preferably along a perpendicular direction. The magnetic intensity of the reorientation magnet 15 is such as to vary the magnetic orientation exclusively of the part of regions which has low coercivity, whereas the regions with high coercivity are in practice not influenced by the reorientation magnet.

A second magnetic read head, indicated at 16, is provided next to the reorientation magnet, downstream with respect to the readout direction of the document, and detects exclusively the regions which are not de-orientated, i.e. the regions which still have the North-South magnetic orientation in the read direction, while in practice it does not sense the regions in which the orientation has been varied and arranged perpendicular to the read direction.

An exit magnet, indicated at 18, is arranged next to the second read head and has the function of re-orientating all the regions, i.e. both with low and high coercivity, so that the document is ready for a subsequent readout, and so that if it is examined with a magnetic lens it does not allow to point out regions with a different magnetic orientation.

With this magnetic ink medium, i.e. by virtue of the presence of magnetic regions with different coercivity, it is possible to read in practice a code within the code, i.e. to perform two different readouts, both of which can be decoded for authentic documents, thus constituting a further degree of anti-forgery security.

From what has been described above it can thus be seen that the invention achieves the intended purposes, and in particular the fact is stressed that a magnetically detectable bar code is provided which has a very high degree of security, since by means of appropriate readout methods it provides two different sensing levels and consequently two different readouts which can be individually detected and decoded, ensure authenticity in the most absolute manner and make the code impossible to be forged.

The invention thus conceived is susceptible to numerous modifications and variations, all of which are within the scope of the inventive concept. In particular, the magnetic regions may have more than two different coercivities and hence the sensing unit may present more than one reorientation magnets.

All the details may furthermore be replaced with other technically equivalent elements.

In practice, the materials employed, as well as the dimensions and contingent shapes, may be any according to the requirements.

I claim:

1. In combination, a magnetic ink medium and a reading unit for reading said magnetic ink medium, a read direction being defined along which said reading unit reads said magnetic ink medium, said magnetic ink medium comprising a plurality of magnetic material regions mutually arranged along said read direction, said plurality of magnetic material regions being mutually separated along said read direction by non-magnetic spaces, at least one first part of said magnetic material regions having a first magnetic coercivity, at least one second part of said magnetic material regions having a second magnetic coercivity, said first magnetic coercivity being substantially higher than said second magnetic coercivity, at least one first portion of said magnetic material regions having a first magnetic intensity according to a first amount of magnetic material used therein, at least one second portion of said magnetic material regions having a second magnetic intensity according to a second amount of magnetic material used therein, said first magnetic intensity being substantially different than said second magnetic intensity, said reading unit comprising, arranged in succession along said read direction, an entry magnet, a first read head, a reorientation magnet, a second read head, and an exit magnet, said entry magnet providing an entry magnetic field having a first direction, said entry magnetic field having sufficient induction to magnetize both said at least one first part and said at least one second part of said magnetic material regions in a direction parallel to said first direction, said first read head being adapted to read said magnetic material regions after such regions have been subjected to said entry magnetic field and being adapted to generate a first electrical signal which is a function of the reading thereof, said reorientation magnet providing a reorientation magnetic field having a reorientation direction, said reorientation direction being substantially perpendicular to said first direction, said reorientation magnetic field having a reorientation induction which selectively magnetizes said at least one second part of said magnetic material portions in a direction parallel to said reorientation direction while leaving said at least one first part of said magnetic material portions magnetized in said first direction, said second read head being adapted to read said magnetic material regions after such regions have been subjected to said reorientation magnetic field and being adapted to generate a second electrical signal which is a function of the reading thereof, said exit magnet providing an exit magnetic field sufficient to magnetize both said at least one first part and said at least one second part of said magnetic material regions in an identical direction, said first direction being substantially perpendicular to said read direction and said reorientation direction being substantially parallel to said read direction.

2. In combination, a magnetic ink medium and a reading unit for reading said magnetic ink medium, a read direction being defined along which said reading unit reads said magnetic ink medium, said magnetic ink medium comprising a plurality of magnetic material regions mutually arranged along said read direction, said magnetic material regions comprising a magnetic oxide layer, said plurality of magnetic material regions being mutually separated along said read direction by non-magnetic spaces, at least one first part of said magnetic material regions having a first magnetic coercivity, at least one second part of said magnetic material regions having a second magnetic coercivity, said first magnetic coercivity being substantially higher than said second magnetic coercivity, at least one first portion of said magnetic material regions having a first magnetic intensity according to a first amount of magnetic material used therein, at least one second portion of said magnetic material regions having a second magnetic intensity according to a second amount of magnetic material used therein, said first magnetic intensity being substantially different than said second magnetic intensity, said reading unit comprising, arranged in succession along said read direction, an entry magnet, a first read head, a reorientation magnet, a second read head, and an exit magnet, said entry magnet providing an entry magnetic field having a first direction, said entry magnetic field having sufficient induction to magnetize both said at least one first part and said at least one second part of said magnetic material regions in a direction parallel to said first direction, said first read head being adapted to read said magnetic material regions after such regions have been subjected to said entry magnetic field and being adapted to generate a first electrical signal which is a function of the reading thereof, said reorientation magnet providing a reorientation magnetic field having a reorientation direction, said reorientation direction being substantially perpendicular to said first direction, said reorientation magnetic field having a reorientation induction which selectively magnetizes said at least one second part of said magnetic material portions in a direction parallel to said reorientation direction while leaving said at least one first part of said magnetic material portions magnetized in said first direction, said second read head being adapted to read said magnetic material regions after such regions have been subjected to said reorientation magnetic field and being adapted to generate a second electrical signal which is a function of the reading thereof, said exit magnet providing an exit magnetic field sufficient to magnetize both said at least one first part and said at least one second part of said magnetic material regions in an identical direction, said first direction being substantially perpendicular to said read direction and said reorientation direction being substantially parallel to said read direction, said identical direction of said exit magnet being substantially perpendicular to said read direction.

3. A method for reading a magnetic ink medium, said magnetic ink medium comprising a plurality of magnetic material regions mutually arranged along a read direction, said plurality of magnetic material regions being mutually separated along said read direction by non-magnetic spaces, at least one first part of said magnetic material regions having a first magnetic coercivity, at least one second part of said magnetic material regions having a second magnetic coercivity, said first magnetic coercivity being substantially higher than said second magnetic coercivity, at least one first portion of said magnetic material regions having a first magnetic intensity according to a first amount of magnetic material used therein, at least one second portion of said magnetic material regions having a second magnetic intensity according to a second amount of magnetic material used therein, said first magnetic intensity being substantially different than said second magnetic intensity, said method comprising the successive steps of:

subjecting said plurality of magnetic material regions to an entry magnetic field having a first direction and having sufficient induction to magnetize both said at least one first part and said at least one second part of said magnetic material regions in a direction parallel to said first direction, reading said magnetic material regions and generating a first electrical signal which is a function of the reading thereof, subjecting said plurality of magnetic material regions to a reorientation magnetic field having a reorientation direction and a reorientation induction which selectively magnetizes said at least one second part of said magnetic material portions in a direction parallel to said reorientation direction while leaving said at least one first part of said magnetic material portions magnetized in said first direction, said reorientation direction being substantially perpendicular to said first direction, reading said magnetic material regions and generating a second electrical signal which is a function of the reading thereof, subjecting said plurality of magnetic material regions to an exit magnetic field having an exit induction which is sufficient to magnetize both said at least one first part and said at least one second part of said magnetic material regions in an identical direction.

* * * * *